J. HAAG.
Dies for Cutting Gloves.

No. 152,367. Patented June 23, 1874.

Witnesses.
C. H. Brown
N. X. Ellsworth

Inventor
Jacob Haag
by his Attys.

UNITED STATES PATENT OFFICE.

JACOB HAAG, OF GLOVERSVILLE, NEW YORK.

IMPROVEMENT IN DIES FOR CUTTING GLOVES.

Specification forming part of Letters Patent No. 152,367, dated June 23, 1874; application filed April 20, 1874.

*To all whom it may concern:*

Be it known that I, JACOB HAAG, of Gloversville, in the county of Fulton and State of New York, have invented certain new and useful Improvements in Dies for Cutting Gloves; and I do hereby declare the following to be a full, clear, and exact description thereof, reference being had to the accompanying drawings, forming part of this specification, in which—

Figure 1:
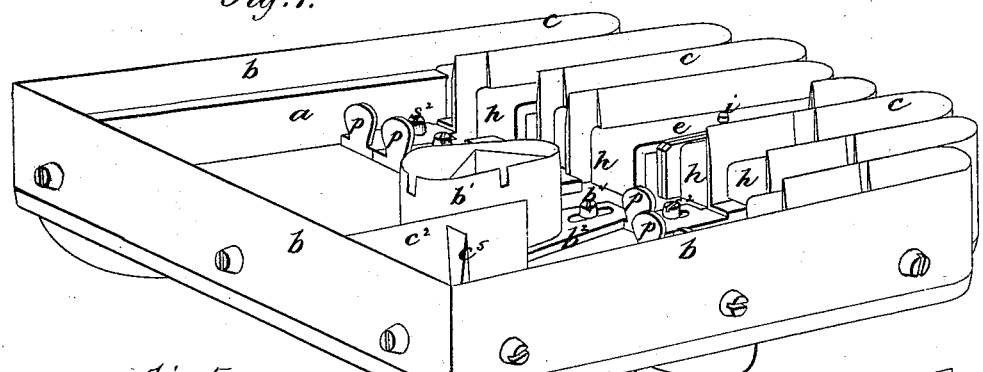
Figure 5:
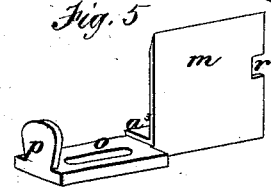
Figure 6:
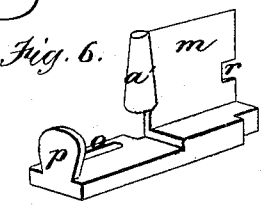
Figure 2:
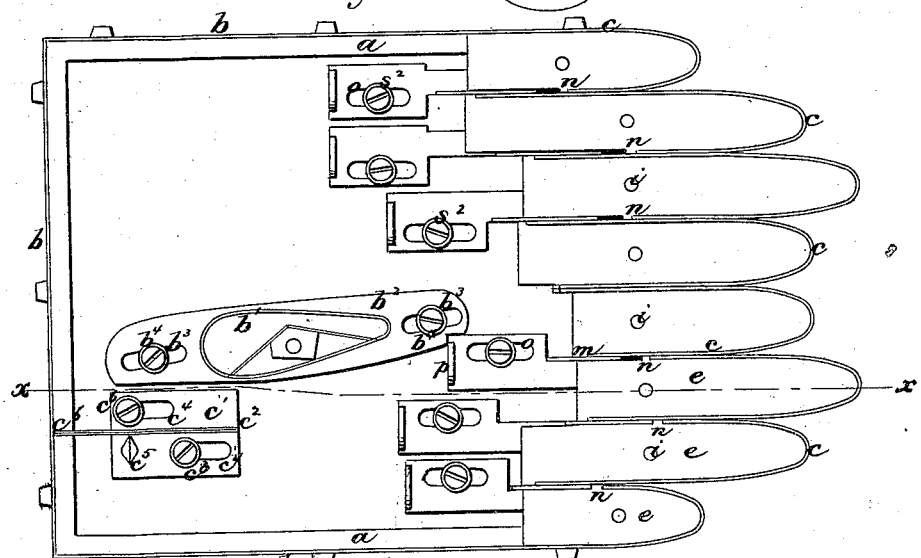
Figure 3:
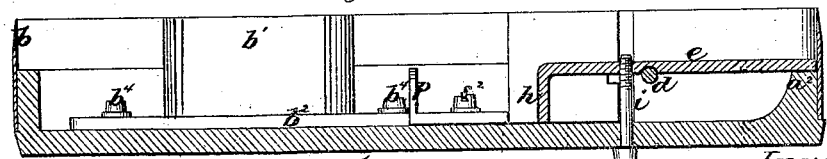
Figure 4:
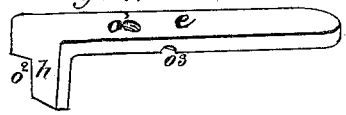

Figure 1 is a perspective view of my improved die for cutting out gloves. Fig. 2 is a top view of the same. Fig. 3 is a longitudinal section in the line $x\,x$, Fig. 2. Fig. 4 is a perspective view of one of the holding-plates removed. Fig. 5 is a perspective view of one of the adjustable blades; and Fig. 6 is a similar view, showing also the eyelet attachment.

In dies employed for cutting out gloves, a separate die has heretofore been used for each size of glove, which requires the employment of many dies to cut out the various sizes of gloves.

The object of my invention is to remedy this defect and dispense with dies for each different size of glove, and at the same time cut out better fitting gloves; and to these ends my invention consists, first, in lengthening or shortening the finger-slit cutters of the die by means of adjustable cutters, of peculiar construction, sliding in the die and attached thereto at the termination of the fixed finger-slit cutters, so that different-sized gloves, or gloves with different lengths of fingers, may be cut out with one die. My invention further consists in the employment of peculiarly-formed holding-plates inserted between the fixed finger-slit cutters for each finger of the glove, which brace said cutters, and form a seat or support in which the movable cutters can be adjusted for gloves of different lengths of fingers. My invention also consists in the employment of eyelet-cutters attached to the adjustable cutters at their bases or at the termination of the finger-slits of the inside or palm of the glove to cut out a perforation for the purpose of rounding the seam, so that the glove will not tear or rip between the fingers. My invention also consists in the employment of cutters on movable plates, the said cutters forming the button-slit and button-hole, and adjustable for different-sized gloves.

In the accompanying drawings, $a$ is the frame of the die, around the outer sides of which are attached the fixed cutters $b\,b$ for cutting out the main portion of the glove, and the fixed finger-slit cutters $c\,c$ for cutting out the fingers, all of which are of the ordinary construction. $e\,e$ are holding-plates inserted between the cutters $c\,c$, for forming or cutting the finger-slits, the front ends of said holding-plates resting on the toes or projections $a^2$, (see Fig. 3,) in the front part of the die. $d\,d$ are pins extending between the finger-slit cutters $c\,c$, bracing them, and serving also as supports for the holding-plates $e\,e$, a semicircular recess, $o^3$, (see Fig. 4,) in the lower face of each of the latter fitting over the pins $d$ between the adjoining finger-slit cutters. The holding-plates $e\,e$ are bent right-angularly at their inner ends, as seen at $h$, and provided with rabbets $o^2$, in which slide the movable cutters $m\,m$, provided with a projection or handle, $p$, by which they can be moved out or in, and adjusted by set-screws $s^2$ and washers, the former passing through slots $o$ in the base-plate of the adjustable cutters $m$, and a corresponding hole in the base-plate of the die. $n\,n$ are projections on the sides of the holding-plates $e\,e$, which bear against the ends of the fixed finger-slit cutters $c\,c$, and $i\,i$ (see Fig. 3) are screws passing through the base-plate of the die and corresponding holes in the holding-plates, to securely hold the latter in place. The sliding cutters $m$ have right-angled projections $a^3$ at their bases, which fit in the rabbets $o^2$ in the right-angled projection $h$ of the holding-plates, and can readily be slid therein and adjusted by means of the slot $o$ and screw $s^2$, so as to cut finger-slits of any length desired, the edges of the movable cutters $m$ and the fixed finger-cutters being of the same height and in juxtaposition, and beveled so as to cut in the same plane.

It will be seen from this construction, that when the adjustable cutters $m\,m$ are slid forward as far as possible in the rabbets $o^2$ in the holding-plates $e\,e$, the notches $r\,r$ in the front edges of the adjustable cutters $m$, fitting over the projections $n\ n$ in the holding-plates, and the beveled edges of the fixed and adjustable finger-slit cutters being in the same right line, that a glove of the smallest size will be cut out of the material used, and by adjusting the cutters and moving them from the fixed finger-cutters, gloves of varying sizes may be cut from the material.

$b^1$ is the thumb-cutter, securely attached to the sliding plate $b^2$, and adjustable forward and backward for different-sized gloves by means of the slots $b^3\ b^3$ in the plate $b^2$ and screws $b^4\ b^4$. $c^1$ is a sliding plate, attached to the base-plate of the die, and provided with the button-slit cutter $c^2$, securely attached thereto, and the button-hole cutter $c^5$. The rear end of the button-slit cutter $c^2$ is inserted in a groove, $c^6$, in the frame $a$ of the die. $c^4\ c^4$ are slots in the sliding plate $c^1$, through which pass screws $b^4\ b^4$, which also pass through the bed-plate of the die, by means of which the button-slit and button-hole cutter can readily be adjusted for different-sized gloves.

In cutting out gloves from leather or other material which is not heavy, and which are liable to rip or tear at the termination of the finger-slits on the inner or palm side of the hand, I employ eyelet-cutters $a^1\ a^1$ (see Fig. 6) at the base or termination of the adjustable cutters $m\ m$, which cut perforations in the material at the end of the finger-slits, for the purpose of rounding the seam, so that the glove will not tear or rip between the fingers; but when quirks are used, or in cutting heavy leather, the eyelets are not employed. The eyelet-cutters $a^1\ a^1$ being situated on the sliding cutters $m\ m$, are adjustable with the latter for different-sized gloves.

I claim as my invention—

1. A die for cutting out gloves provided with adjustable eyelet-cutters, substantially as described, and for the purpose set forth.

2. A die for cutting out gloves provided with an adjustable button-slit and button-hole cutter, substantially as described, and for the purpose set forth.

3. The holding-plate $e$, provided with the right-angled projection $h$, rabbet $o^2$, semicircular recess $o^3$, and projection $n$, substantially as described, and for the purpose set forth.

4. The holding-plate $e$, constructed as set forth, in combination with the die-frame $a$, finger-slit cutter $c$, brace-rod $d$, and screw-bolt $i$, substantially as described, and for the purpose set forth.

5. The adjustable cutters $m$, provided with a recess, $r$, shoulder $a^3$, slot $o$, and projection $p$, substantially as described, and for the purpose set forth.

6. The adjustable cutters $m$, constructed as described, in combination with the holding-plates $e$ and fixed cutters $c\ c$, substantially as described, and for the purpose set forth.

7. The adjustable cutter $m$, provided with an eyelet-cutter, $a^1$, recess $r$, slot $o$, and projection $p$, substantially as described, and for the purpose set forth.

8. The adjustable cutters $m$, provided with eyelet-cutters $a^1$, in combination with the holding-plates $e$ and fixed cutters $c\ c$, substantially as described, and for the purpose set forth.

9. The slotted sliding plate $c^1$, provided with the adjustable button-slit cutter $c^2$, and adjustable button-hole cutter $c^5$, substantially as described, and for the purpose set forth.

10. The combination of the fixed finger-slit cutters $c\ c$, holding-plates $e\ e$, adjustable cutters $m\ m$, adjustable thumb-cutter $b^1$, and adjustable button-slit and button-hole cutters $c^2\ c^5$, substantially as described, and for the purpose set forth.

JACOB HAAG.

Witnesses:
J. B. WHIPPLE,
C. W. ROSE.